10/8/85 . OR 4,545,799

United States Patent [19]

Rhodes et al.

[11] Patent Number: 4,545,799

[45] Date of Patent: Oct. 8, 1985

[54] METHOD OF MAKING DIRECT SEAL BETWEEN NIOBIUM AND CERAMICS

[75] Inventors: William H. Rhodes, Lexington; Caryl S. Pitt, Natick; John J. Gutta, North Andover, all of Mass.

[73] Assignees: GTE Laboratories Incorporated, Waltham; GTE Products Corporation, Danvers, both of Mass.

[21] Appl. No.: 529,464

[22] Filed: Sep. 6, 1983

[51] Int. Cl.[4] .............................................. C03C 29/00

[52] U.S. Cl. .................................. 65/59.21; 65/59.23; 65/59.25; 65/59.31; 65/59.35; 313/623

[58] Field of Search ................. 65/59.31, 59.21, 59.23, 65/59.25, 59.27, 59.35, 59.6; 313/623, , 220

[56] References Cited

U.S. PATENT DOCUMENTS

| | | | |
|---|---|---|---|
| 2,561,520 | 7/1951 | Lemmens et al. | 65/59.21 X |
| 2,699,594 | 1/1955 | Bowne | 65/59.23 X |
| 3,035,372 | 5/1962 | Mayers | 65/59.23 X |
| 3,281,309 | 10/1966 | Ross . | |
| 3,428,846 | 2/1969 | Rigden et al. | 313/284 |
| 3,441,421 | 4/1969 | Sarver et al. | 106/39 |
| 3,448,319 | 6/1969 | Louden | 313/221 |
| 3,564,328 | 2/1971 | Bagley | 313/220 |
| 4,004,173 | 1/1977 | Rigden | 313/317 |

FOREIGN PATENT DOCUMENTS

| | | | |
|---|---|---|---|
| 866371 | 7/1949 | Fed. Rep. of Germany | 65/59.27 |

*Primary Examiner*—Robert Lindsay

*Attorney, Agent, or Firm*—J. Stephen Yeo

[57] ABSTRACT

A high pressure arc lamp has a ceramic arc tube envelope. A niobium feedthrough positions electrodes within the tube. A ceramic insert at each end of the tube forms a direct high temperature hermetic seal with the niobium feedthrough and the ceramic tube without the use of frits or brazing.

1 Claim, 2 Drawing Figures

METHOD OF MAKING DIRECT SEAL BETWEEN NIOBIUM AND CERAMICS

BACKGROUND OF THE INVENTION

This invention pertains to high pressure discharge lamps and, more particularly, is concerned with sealing electrodes used in such lamps.

High-pressure sodium (HPS) lamps are typically constructed with alumina or yttria translucent arc tubes hermetically sealed to a niobium electrical current feedthrough by a ceramic sealing frit consisting of $Al_2O_3$-CaO-MgO-BaO (J. F. Ross, "Ceramic Bonding," U.S. Pat. No. 3,281,309, Oct. 25, 1966; J. F. Sarver et al., "Calcia-Magnesia-Seal Compositions," U.S. Pat. No. 3,441,421, Apr. 29, 1969; and W. C. Louden, "Niobium End Seal," U.S. Pat. No. 3,448,319, June 3, 1969).

Brazing with eutectic metal alloys (A. R. Rigden, B. Heath, and J. B. Whiscombe, "Closure of Tubes of Refractory Oxide Materials," U.S. Pat. No. 3,428,846, Feb. 18, 1969; A. R. Rigden, "Niobium Alumina Sealing and Product Produced Thereby," U.S. Pat. No. 4,004,173, Jan. 18, 1977) has also been employed on a production basis, but is no longer favored due to long-term embrittlement problems.

The disadvantages with the standard HPS sealing techniques are that: (1) they limit the end temperature (cold spot) to 800° C., and (2) they introduce new phases that can react chemically with active metal or metal halide fills.

The HPS high-color rendering index lamp has a cold spot temperature near 800° C., and it is possible that sodium reacts with the sealing frit limiting lamp life. Eliminating the frit would prevent this type of life-limiting reaction.

For a better understanding of the present invention, together with other and further objects, advantages and capabilities thereof, reference is made to the following disclosure and appended claims in connection with the above-described drawings.

DESCRIPTION OF THE PREFERRED EMBODIMENT

Figure 1:
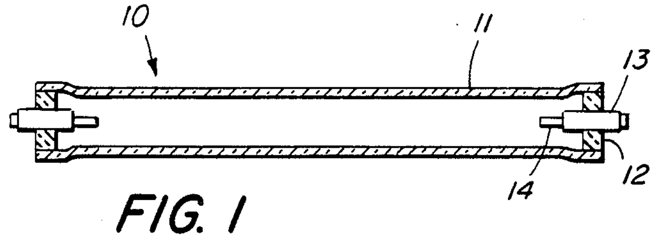
FIG. 1 is a schematic representation of a high pressure arc lamp tube assembly which embodys the invention.

FIG. 1 illustrates a high pressure discharge lamp tube assembly 10 incorporating one embodiment of the invention. The envelope of assembly 10 is a transparent ceramic tube 11. Each end of the tube 11 is sealed by a ceramic insert 12, each of which supports a cylindrical metal feedthrough 13. Niobium is the preferred metal because it is refractory, chemically compatible, and has a similar thermal coefficient to yttria and alumina. A tungsten electrode is positioned on one end of a feedthrough 13.

Figure 2:
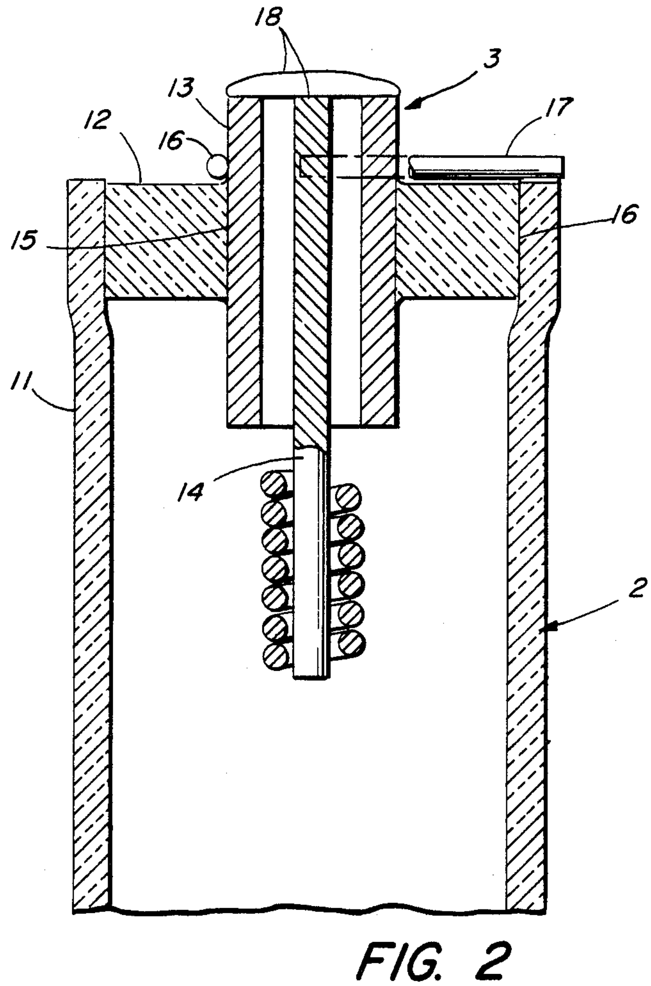
FIG. 2 illustrates in more detail one end of the tube assembly of FIG. 1.

FIG. 2 represents a first end of the assembly showing in more detail the tube 11, insert 12, feedthrough 13, and electrode 14. As a feature of the invention the interface 15 between the insert 12 and feedthrough 13 is direct, without brazing or frit.

In keeping with the invention, insert 12 is made from a compressed mixture of fine ceramic powder (e.g., alumina or yttria) which is cold pressed or machined into a disc with an axial hole. Prior to heating the insert is in an unsintered or so-called "green" state. Upon sintering the volume of the insert 12 decreases with both its outside diameter and its inner diameter decreasing. The dimensions of the unsintered insert are selected in relation to the inside diameter of the ceramic tube and the outside diameter of the feedthrough so that if the insert were to be sintered without being assembled with either the tube 11 or feedthrough 13, the sintered insert's 12 outside diameter would be 2 to 20% greater than the inside diameter of the sintered tube and the insert's inside diameter would be 2 to 20% less than the outside diameter of the feedthrough. The materials of the tube and insert are selected to have similar thermal expansion coefficients and to be chemically compatible. Both tube and insert may be of the same matrix material.

The unsintered insert 12 is inserted in each end of the unsintered tube 11. The assembly is heated in an atmospheric furnace until both tube 11 and insert 12 are partially sintered. During sintering the diameter of tube 11 shrinks more than that of the insert 12. The tube 11 deforms slightly about the insert. As is known in the prior art, this procedure results in a bond at the tube-insert interface 16.

Next, as a feature of the invention, the cylindrical niobium feedthrough 13 is positioned directly in the axial hole running through the insert 12 without brazing or frit. The feedthrough 13 is temporarily held in place by niobium wires and then the assembly is heated until both tube 11 and insert 12 are fully sintered. The diameter of the insert continues to contract during the sintering operation and the inner surface of the insert is forced against the feedthrough. The ceramic insert deforms at a lower flow stress than the niobium insert and so is deformed slightly and bulges out at the insert-feedthrough interface 15 forming thereby a brazeless, fritless hermetic seal at the interface. There appears to be both a mechanical and diffusion bond.

During the sintering operation, the tube-insert-feedthrough assembly is heated at the temperature and time normally used to sinter the type of ceramic materials used for the tube and insert; which are about 1830° C. for 2 hours for alumina, and 2150° C. for 4 hours for yttria. Furnace atmosphere is selected not only for the ceramics, but to limit embrittlement of the niobium. Niobium after being heated to 2150° C. for 1 hour has a hardness corresponding to atmosphere as follows: Vacuum 229 $kg/mm^2$, dry Ar 385 $kg/mm^2$, dry $H_2$ 473 $kg/mm^2$, and wet $H_2$ 563 $kg/mm^2$. These values when compared with a value of 172 $kg/mm^2$ for annealed Nb indicate that either vacuum or dry Ar furnace atmospheres are preferred, although hermetic seals may be made in a wet $H_2$ atmosphere.

The feedthrough 13 has an axial hole into which the tungsten electrode 14 is inserted. One end of the tube is fitted with an electrode. The electrode 14 is welded to a niobium cap 18 which, in turn, is welded to the niobium insert 13.

The tube 11 is then dosed with solid and gaseous fill materials. The other end is fitted with its corresponding electrode and welded closed completing the tube assembly 10.

The direct niobium-to-ceramic seals allow the end temperature to be raised to the operating temperature limit of those materials. The temperature range 800°-1200° C. is now made available permitting many potential metal and metal halide fill ingredients to be considered.

While there has been shown and described what is at present considered the preferred embodiment of the invention, it will be obvious to those skilled in the art that various changes and modifications may be made therein without departing from the scope of the invention as defined by the appended claims.

We claim:

1. A method of making a tube assembly for a high pressure discharge lamp comprised of the steps of:

a. providing a tube made of unsintered compressed ceramic powder b. providing a niobium feedthrough;

c. providing an insert made of unsintered compressed ceramic powder having a similar thermal expansion coefficient as that of said tube, said insert in the shape of a disc with an axial hole;

d. inserting said unsintered insert in an end of the unsintered tube;

e. heating said insert and tube until both are partially sintered and bonded together;

f. positioning said niobium feedthrough in the axial hole of said insert; and g. heating said tube, insert and niobium feedthrough until said tube and insert are fully sintered and said insert is contracted and forced against said niobium feedthrough, forming thereby a brazeless, fritless hermetic seal at the interface between said insert and said niobium feedthrough.

* * * * *